US009432971B2

(12) United States Patent
Dai et al.

(10) Patent No.: US 9,432,971 B2
(45) Date of Patent: Aug. 30, 2016

(54) METHOD AND SYSTEM FOR RADIO RESOURCE CONTROL

(75) Inventors: Qian Dai, Guangdong Province (CN); Yun Deng, Guangdong Province (CN); Lei Mao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 230 days.

(21) Appl. No.: 13/876,492

(22) PCT Filed: Aug. 1, 2011

(86) PCT No.: PCT/CN2011/077878
§ 371 (c)(1),
(2), (4) Date: Apr. 26, 2013

(87) PCT Pub. No.: WO2012/041122
PCT Pub. Date: Apr. 5, 2012

(65) Prior Publication Data
US 2013/0288693 A1 Oct. 31, 2013

(30) Foreign Application Priority Data
Sep. 29, 2010 (CN) .......................... 2010 1 0503855

(51) Int. Cl.
H04W 72/04 (2009.01)
H04W 76/02 (2009.01)
(52) U.S. Cl.
CPC ............. *H04W 72/04* (2013.01); *H04W 76/02* (2013.01)
(58) Field of Classification Search
CPC . H04W 74/00; H04W 74/004; H04W 76/00; H04W 76/02; H04W 72/04
USPC ........................................................ 455/435.1
See application file for complete search history.

(56) References Cited

U.S. PATENT DOCUMENTS

| 8,249,610 | B2* | 8/2012 | Cave ...................... H04W 28/16 370/229 |
| 2008/0194259 | A1* | 8/2008 | Vujcic et al. ............... 455/435.1 |
| 2010/0080116 | A1 | 4/2010 | Agashe et al. |
| 2011/0014912 | A1* | 1/2011 | Ahluwalia et al. ........ 455/435.1 |

FOREIGN PATENT DOCUMENTS

GB 2465192 A * 5/2010

OTHER PUBLICATIONS

"Signalling Congestion Control for Low-Priority-Access"; Ericsson, ST-Ericsson; Approval, 9.6.1/Overload Control; NIMTC/Rel-10; 3GPP TSG SA WG2 Meeting #79 May 10-14, 2010, Kyoto, Japan; TD S2-102760; see pp. 1-5/E.
International Search Report for PCT/CN2011/077878 dated Oct. 11, 2011.

* cited by examiner

*Primary Examiner* — Marisol Figueroa
(74) *Attorney, Agent, or Firm* — Ling Wu; Stephen Yang; Ling and Yang Intellectual Property

(57) ABSTRACT

A method and system for radio resource control are provided in the present document. The method includes: in a process of establishing a Radio Resource Control (RRC) connection, a user equipment sending a RRC connection request message to a base station, and carrying information used for indicating an current access property in the RRC connection request message; and the base station judging whether to permit the user equipment to establish the RRC connection according to the information used for indicating the current access property. It enables the user equipment to report more accurate information related to call establishment types, so as to assist a network side to perform more flexible and precise admission control.

5 Claims, 2 Drawing Sheets

METHOD AND SYSTEM FOR RADIO RESOURCE CONTROL

TECHNICAL FIELD

The invention relates to the field of radio communication technology, and especially, to a method and system for radio resource control.

BACKGROUND OF THE RELATED ART

The 3rd generation mobile communications Long Term Evolution (LTE) system is composed of an Evolved Universal Terrestrial Radio Access Network (E-UTRAN), a User Equipment (UE) and an Evolved Packet Core (EPC). Wherein, the E-UTRAN is composed of an enhanced Node B (eNB) of an access network element. The eNB is connected to the terminal UE through an interface Uu, and it is connected to core network elements such as a Mobility Management Entity (MME) through an interface S1.

Currently, an access network side has multi-layered access control processing mechanisms with respect to access of the user equipment, so as to guarantee that situations such as the overload will not occur at the network side due to the access of excess user equipments.

The user equipment accessing the network side is required to complete a plurality of processes as shown in FIG. 1:

random access process: the user equipment completes the synchronization between the user equipment and network side through the process;

Radio Resource Control (RRC) connection process: it establishes a signalling bearer for the user equipment and access network element; and Attach process: it completes acquisition of user equipment identifier information, an authentication process and security setup.

In the existing protocol, the network side sets 15 Access Classes (ACs) for different call types, wherein common calls all belong to AC0~9, emergency calls belong to AC10, and other high priority calls belong to AC11~15. The network side sets a control factor for the AC0~9, sets an identifier "Ban or Not" for the AC10 and AC11~15, and sends the control factor and the identifier to the user equipment, so as to control random access behaviors of these call types.

In the RRC connection process, the signalling interaction between the user equipment and access network element is as shown in FIG. 2 and FIG. 3, and it has two flows: connection establishment flow and connection rejection flow.

Through these two flows, according to information such as data load capacity and signalling load capacity of the network side and air interface load capacity and so on, the network side can make a judgment of "Accept" or "Reject" on a RRC connection request of the user equipment.

Considering that the connection request initiated by the user equipment may be based on various services, and priorities of the services are different, and in order to implement more flexible and effective admission control, in the current RRC layer protocol, the user equipment is required to carry establishment cause information in the RRC connection request.

The existing establishment cause information includes the following contents:

Emergency (it is indicated that the user equipment initiates an emergency call), High Priority Access (it is indicated that the user equipment initiates a high priority service type call), mt-Access (it is indicated that the user equipment applies for establishing a connection due to being called), mo-Signalling (it is indicated that the user equipment initiates a calling signalling type call), and mo-Data (it is indicated that the user equipment initiates a calling data type call).

The above establishment cause information is only applied to the 3GPP release 9 and the previous version of the user equipment.

With the development of the conception of Internet of Things, Machine to Machine (M2M) communication (called as Machine Type Communication (MTC) in the 3GPP) will be gradually introduced to the whole society. M2M is defined as the machine to machine communication in a narrow sense, and it is defined as networked applications and services with a machine terminal intelligent interaction as the core in a broad sense. Based on an intelligent machine terminal, it uses various communication modes as access means to provide an informationalized solution for clients, which is used to satisfy informatization requirements of the clients on aspects of monitoring, command and dispatch, data acquisition and measurement and so on.

In the M2M applications, the scope of service types is extremely extensive, such as home meter reading, industrial meter manufacture automation, water quality monitoring, intelligent transportation and asset tracking and so on, the M2M applications will enter all walks of life and thousands of households, and the service types of the M2M will also be various, and Quality of Service (QoS) requirements of the network side and operators will also be diverse. The number of user equipments of the M2M will also greatly exceed the number of mobile phones at present, and it will cause enormous pressure of service load to the current and future radio networks. Since the number of user equipments of the M2M is huge, the 3GPP currently put forwards a concept of managing the user equipments in a group way.

Under the background of the M2M applications, how to protect the network and prevent the network from an occurrence of overload becomes a problem required to be solved at present.

In the current protocol, the user equipment can establish a connection to the network through random access, and in the process of completing the attachment, the access network element can perform access control on the random access process and also can perform control on the RRC connection request of the user equipment in the RRC layer, but the flexibility of the current control mechanism cannot satisfy the admission control of high-density and multi-service user equipments any more.

For example, at present, statistical results of the operators show that, the load of data services (such as net surfing, video calls and FTP downloading and so on) in the radio communication has exceeded the load of voice services. When the network faces the overload pressure, an appropriate method is to perform certain admission control on the data services and guarantee the normal service of the voice services since the voice services are generally the foundation of network operation from the perspective of operators. However, according to the current protocol standard, when the user equipment initiates voice calls and data service calls, all the establishment cause information in the RRC connection request is mo-Data, and the network side cannot distinguish whether they are the voice services or the data services, thereby failing to perform flexible admission control.

In addition, different M2M applications have different service models, a service model means a data transmission model during the data interaction between the user equipment and the network side, elements for representing the service model include: data interaction periodicity, data interaction frequency, data size, data interaction direction (i.e. uplink data dominated, or downlink data dominated, or similar uplink traffic and downlink traffic). An intelligent electric meter is taken as an example, certain electric power companies require that each intelligent electric meter report meter reading data once every 5 minutes, certain electric power companies require that each intelligent electric meter report meter reading data once every 1 hour, and certain electric power companies even require that the intelligent electric meter only report meter reading data once every day, and since traffic of the meter reading data at each time is comparatively small, it forms 3 kinds of different service models, which can be respectively called as high frequency periodic small data report, low frequency periodic small data report and extra-low frequency periodic small data report. For another example, a common voice service can be called as an extra-high frequency periodic small data interaction model. For another example, an internet service (generally the webpage is clicked once every dozen of seconds, the downlink data are dominated, and the data traffic is larger) can be called as a medium frequency aperiodic big data download model. These different service models are obviously diverse with respect to the network pressure, but the current mechanism cannot distinguish these service models.

Different services still have different Qos requirements, and the Qos requirements related to the admission control include: access delay tolerance, for example, certain services are extremely sensitive to access delay (such as services including fire alarm, safeguard and medical monitoring and so on), and certain services have a low sensitivity to the access delay (such as meter reading), and the current mechanism cannot distinguish these differences.

Different services or user equipments still have different priorities, such as priorities of services related to finance, safeguard and medical treatment should be higher than priorities of common services, but the current mechanism cannot make a distinction.

After the M2M are widely applied, these defects will become more serious.

SUMMARY OF THE INVENTION

In order to solve the above problem, the present document provides a method and system for radio resource control, to enable a network side to master information of a user equipment more accurately and guarantee that the network side performs more flexible and precise admission control.

In order to solve the above problem, the present document provides a method for radio resource control, which comprises:

in a process of establishing a Radio Resource Control (RRC) connection, a user equipment sending a RRC connection request message to a base station, and carrying information used for indicating a current access property in the RRC connection request message; and the base station judging whether to permit the user equipment to establish the RRC connection according to the information used for indicating the current access property.

The user equipment selects the information used for indicating the current access property from a RRC establishment cause list predetermined by the user equipment and a network side.

The above method further comprises: the user equipment selecting the information used for indicating the current access property from the RRC establishment cause list predetermined by the user equipment and the network side in the following way:

the user equipment selecting a RRC establishment cause in accordance with the current access property from the RRC establishment cause list, and using an index corresponding to an selected RRC establishment cause as the information used for indicating the current access property to be added in the RRC connection request message.

Each RRC establishment cause in the RRC establishment cause list comprises one or multiple combinations of the following information:

service type information, type information of user equipment, group information of user equipment, priority information of user equipment, priority information of service, type information of service model, public land mobile network type information, access class information and QoS requirement type information of service.

The service type information is information classified according to call services;

the group information of user equipment is a serial number of user equipment group or an identifier of user equipment group;

the priority information of user equipment is a priority serial number of user equipment or a priority identifier of user equipment predetermined by the network side and the user equipment;

the priority information of service is a priority serial number of service or a priority identifier of service predetermined by the network side and the user equipment;

the type information of service model is data communication model information of service, including one or multiple combinations of the following information: data interaction periodicity, data interaction frequency, data size and data interaction direction;

the public land mobile network type information comprises one or multiple kinds of the following information: identifier information whether the user equipment is in a home Public Land Mobile Network (HPLMN) of the user equipment, identifier information whether the user equipment is in an equivalent HPLMN of the user equipment, identifier information whether the user equipment is in one PLMN in a preferred PLMN list contained in a subscriber identity module or a universal subscriber identity module of the user equipment, identifier information whether the user equipment is a roaming user equipment, identifier information of the HPLMN of the user equipment, and identifier information of the equivalent HPLMN of the user equipment;

the access class information is an access class serial number or an access class identifier predetermined by the network side and the user equipment;

the QoS requirement type information of service comprises one or multiple combinations of the following information: access delay tolerance, Guaranteed BitRate and tolerant bit error rate.

In order to solve the above problem, the present document further provides a system for radio resource control, which comprises:

a user equipment, configured to: in a process of establishing a Radio Resource Control (RRC) connection, send a RRC connection request message to a base station, and carry information used for indicating a current access property in the RRC connection request message; and the base station, configured to judge whether to permit the user equipment to establish the RRC connection according to the information used for indicating the current access property.

The user equipment is further configured to: before sending the RRC connection request message to the base station, select the information used for indicating the current access property from a RRC establishment cause list predetermined by the user equipment and a network side.

The user equipment is configured to select the information used for indicating the current access property in the following way: selecting a RRC establishment cause in accordance with the current access property from the RRC establishment cause list, and using the selected RRC establishment cause as the information used for indicating the current access property to be added in the RRC connection request message.

Each RRC establishment cause in the RRC establishment cause list comprises one or multiple combinations of the following information:

call service type information, type information of user equipment, group information of user equipment, priority information of user equipment, priority information of service, type information of service model, public land mobile network type information, access class information and QoS requirement type information of service.

The service type information is information classified according to call services;

the group information of user equipment is a serial number of user equipment group or an identifier of user equipment group;

the priority information of user equipment is a priority serial number of user equipment or a priority identifier of user equipment predetermined by the network side and the user equipment;

the priority information of service is a priority serial number of service or a priority identifier of service predetermined by the network side and the user equipment;

the type information of service model is data communication model information of service, including one or multiple combinations of the following information: data interaction periodicity, data interaction frequency, data size and data interaction direction;

the public land mobile network type information comprises one or multiple kinds of the following information: identifier information whether the user equipment is in a home Public Land Mobile Network (HPLMN) of the user equipment, identifier information whether the user equipment is in an equivalent HPLMN of the user equipment, identifier information whether the user equipment is in one PLMN in a preferred PLMN list contained in a subscriber identity module or a universal subscriber identity module of the user equipment, identifier information whether the user equipment is a roaming user equipment, identifier information of the HPLMN of the user equipment, and identifier information of the equivalent HPLMN of the user equipment;

the access class information is an access class serial number or an access class identifier predetermined by the network side and the user equipment;

the QoS requirement type information of service comprises one or multiple combinations of the following information: access delay tolerance, Guaranteed BitRate and tolerant bit error rate.

The system is a long term evolution system or a universal mobile telecommunications system.

In view of this, the present document provides a method and system for admission control, which enables the user equipment to report more accurate information related to call establishment types, so as to assist the network side to perform more flexible and precise admission control.

PREFERRED EMBODIMENTS OF THE INVENTION

Figure 1:
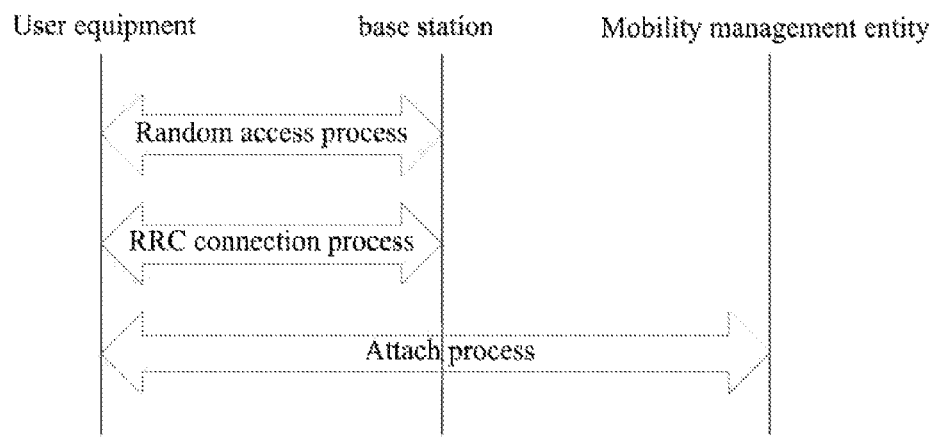
FIG. 1 is a schematic flow diagram required to be completed when the user equipment accesses the network side.
Figure 2:
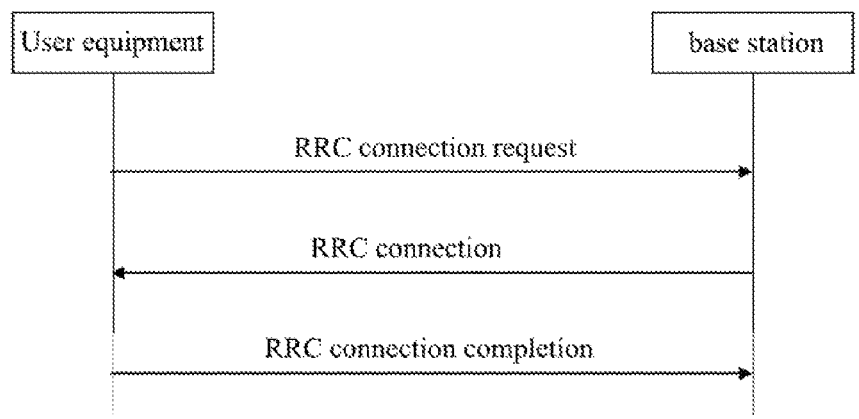
FIG. 2 is a schematic flow diagram of a RRC connection process completion.
Figure 3:
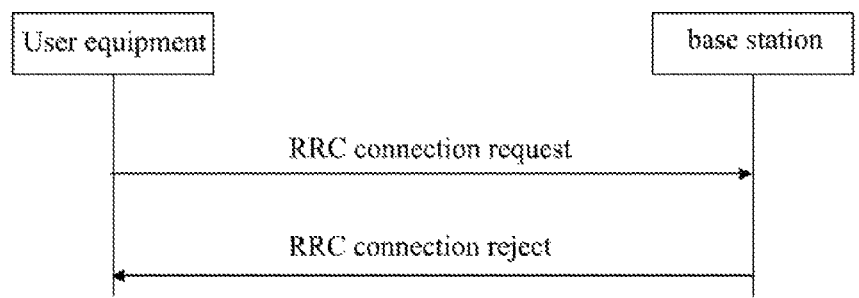
FIG. 3 is a schematic flow diagram of a RRC connection process rejection.
Figure 4:
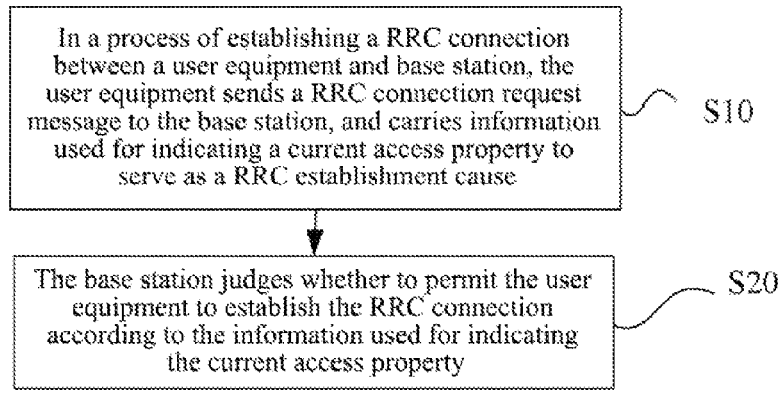
FIG. 4 is a flow diagram of the admission control method according to the invention.

FIG. 4 is a flow diagram of the admission control method according to the invention, and as shown in FIG. 4, the following steps are included.

In S10, in a process of establishing a Radio Resource Control (RRC) connection between a user equipment and a network side, the user equipment sends a RRC connection request message to a base station, and carries information used for indicating a current access property to serve as a RRC establishment cause.

In S20, the base station judges whether to permit the user equipment to establish the RRC connection according to the information used for indicating the current access property.

Furthermore, before sending the RRC connection request message to the base station, the user equipment selects the information used for indicating the current access property from a RRC establishment cause list predetermined by the user equipment and the network side, and specifically, the user equipment selects a RRC establishment cause in accordance with the current access property, and uses an index corresponding to the RRC establishment cause as the information used for indicating the current access property to be added in the RRC connection request message.

In order to make the object, technical scheme and advantages of the invention more clear, the invention will be further described in detail in combination with the examples below and with reference to the accompanying drawings.

Figure 5:
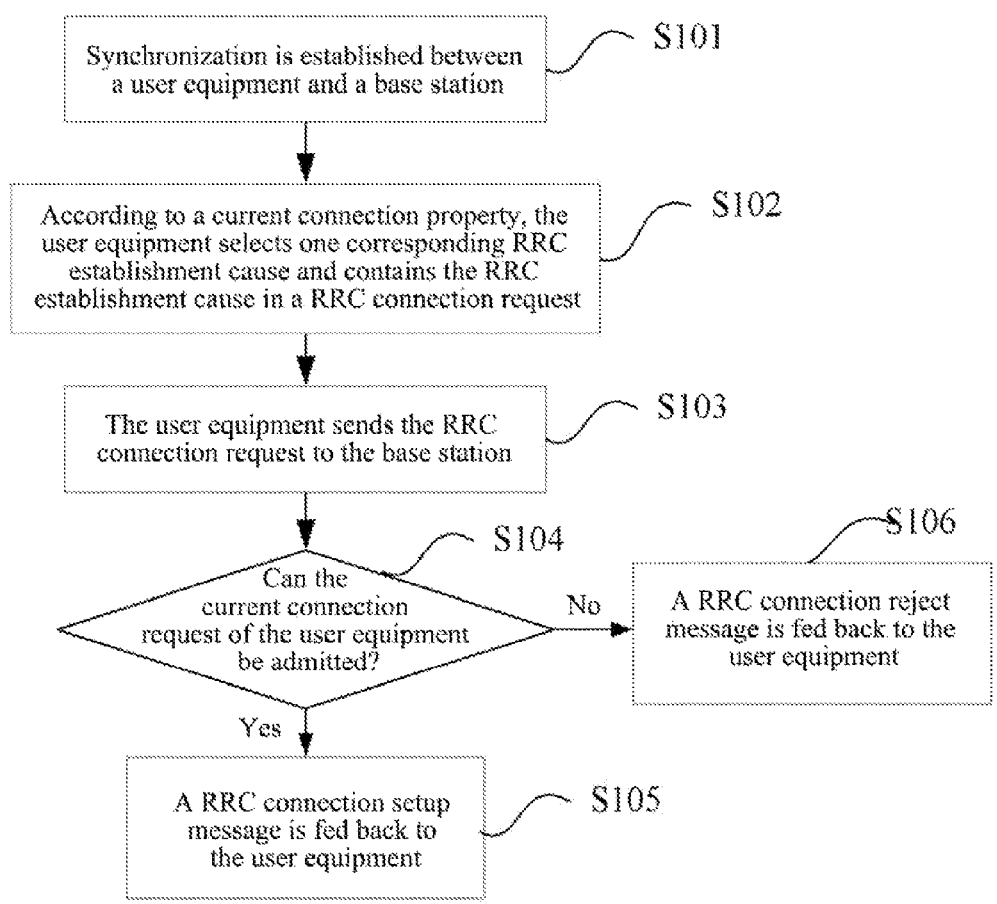
FIG. 5 is a flow diagram of the admission control method according to the example of the invention.

The example is applied to a LTE system or a Universal Mobile Telecommunications System (UMTS). When a user equipment accesses a network side and applies for a RRC connection, it is required to complete the following flow, and as shown in FIG. 5, the following steps are included.

In S101, synchronization is established between the user equipment and the base station.

In S102, according to a current connection property, the user equipment selects a corresponding RRC establishment cause, and contains an index corresponding to the RRC establishment cause in a RRC connection request.

In S103, the user equipment sends the RRC connection request to the base station.

In S104, according to load conditions of the network side and in combination with the RRC establishment cause of the user equipment, the base station judges whether the current connection request of the user equipment can be admitted, if yes, proceeding to step S105, and if no, proceeding to step S106.

In S105, if the base station permits the user equipment to establish a RRC connection, a RRC connection setup message is fed back to the user equipment.

In S106, if the base station does not permit the user equipment to establish the RRC connection, a RRC connection reject message is fed back to the user equipment.

Wherein, the steps S101, S103, S105 and S106 are all in accordance with the existing mechanism.

In step S102, the network side and the user equipment predetermine one RRC establishment cause list, and the user equipment selects a RRC establishment cause in accordance with the current access property from the list.

According to the invention, settings of RRC establishment causes in the RRC establishment cause list can be one or multiple combinations of the following information: call service type information, type information of user equipment, Group information of user equipment, priority information of user equipment, priority information of service, type information of service model, Public Land Mobile Network (PLMN) type information, Access Class information and Quality of Service (Qos) requirement type information of service.

The call service type information refers to information classified according to call services, including one or multiple kinds of the following information:

calling or called voice calls, calling or called video streaming calls, calling or called interactive voice calls, calling or called data calls, and calling or called signalling services and so on.

Wherein, the data calls can only have one simple category and also can further be divided into more detailed categories, such as http internet service, FTP download service, meter reading service, monitoring service, intelligent transportation service and asset tracking service and so on.

The type information of user equipment refers to information classified according to user equipments, including one or multiple kinds of the following information: H2H user equipment, M2M user equipment and other types of user equipments.

The group information of user equipment refers to an identifier of user equipment Group, including a serial number of user equipment Group or an identifier of user equipment Group. According to the current Group mechanism, since a Group-Radio Network Temporary Indicator (Group-RNTI) has been raised in the 3gpp conference, the Group-RNTI can be directly used as the group information of the user equipment, and one serial number predetermined by the user equipment and the network side can also be used as the group information of the user equipment, and the network side establishes a one-to-one correspondence relation between the serial number and the group in advance.

The priority information of user equipment refers to priorities of the user equipment predetermined by the network side and the user equipment, including: a priority serial number or a priority identifier. The priority can be level 1 or multi-level, it can be higher than the priority of the H2H equipment and also can be lower than the priority of the H2H equipment. For example, based on the existing H2H equipment (the H2H equipment described below means the RRC establishment cause included in the existing protocol), it can include the following categories:

simple level 1: H2H equipment and low priority equipment (relative to H2H equipment); or level 2: high priority equipment, H2H equipment and low priority equipment; or multi-level: H2H equipment, low priority level 1 equipment, low priority level 2 equipment . . . and low priority level N equipment (N is a positive integer);

another multi-level: high priority level 1 equipment, high priority level 2 equipment . . . and high priority level M equipment, H2H equipment, low priority level 1 equipment, low priority level 2 equipment . . . and low priority level N equipment (M and N are positive integers);

A corresponding relationship between a specific equipment type and a specific equipment priority is predetermined by the network side and the user equipment.

The priority information of service refers to service priorities predetermined by the network side and the user equipment, including: a priority serial number or a priority identifier. Due to the introduction of smart phones and M2M equipment, the number of service types of the radio communication increases greatly, and the RRC establishment causes in the existing protocol include: Emergency (it is indicated that the user equipment initiates an emergency call), High Priority Access (it is indicated that the user equipment initiates a high priority service type call), mt-Access (it is indicated that the user equipment applies for establishing a connection due to being called), mo-Signalling (it is indicated that the user equipment initiates a calling signalling type call) and mo-Data (it is indicated that the user equipment initiates a calling data type call).

In addition, new service priorities also can be introduced, for example (the H2H service described below means the RRC establishment cause included in the existing protocol), it can include the following categories:

simple level 1: H2H service and low priority service (relative to H2H equipment); or level 2: high priority service, H2H service and low priority service; or multi-level: H2H service, low priority level 1 service, low priority level 2 service . . . and low priority level N service (N is a positive integer);

another multi-level: high priority level 1 service, high priority level 2 service . . . and high priority level M service, H2H service, low priority level 1 service, low priority level 2 service and low priority level N service (M and N are positive integers);

A corresponding relationship between a specific service type and a specific service priority is predetermined by the network side and the user equipment.

The type information of service model refers to data communication models of the service, including one or multiple combinations of the following characteristics: data interaction periodicity (whether it is periodical data interaction), data interaction frequency, data size and data interaction direction (i.e. uplink data dominated, or downlink data dominated, or similar uplink traffic and downlink traffic). For example, it only includes the information of one simple characteristic: small data service model, or high frequency service model, or periodic service model;

it includes the information of multiple kinds of characteristics: periodic small data service model, low frequency periodic small data report, extra-low frequency periodic small data report, extra-high frequency periodic small data interaction model and a medium frequency aperiodic big data download model and so on.

A corresponding relationship between a specific service type and a specific service model is predetermined by the network side and the user equipment.

The PLMN type information is PLMN type information predetermined by the network side and the user equipment, including one or multiple kinds of the following information: identifier information whether the user equipment is in a home PLMN (HPLMN) of the user equipment, identifier information whether the user equipment is in an equivalent HPLMN of the user equipment, identifier information whether the user equipment is in a certain PLMN in a preferred PLMN list contained in a Subscriber Identity Module (SIM) or a Universal Subscriber Identity Module (USIM) of the user equipment, identifier information whether the user equipment is a roaming user equipment, identifier information of the HPLMN of the user equipment, and identifier information of the equivalent HPLMN of the user equipment;

The Access Class information refers to access classes predetermined by the network side and the user equipment, including: an access class serial number or an access class identifier;

such as: Access Class N (N is a positive number great than or equal to 0).

The Qos requirement type information of service includes one or multiple combinations of the following requirements: access delay tolerance, Guaranteed BitRate and tolerant bit error rate. Taking the access delay as an example, it can be set as:

simple level 2: sensitive to access delay and insensitive to access delay;

multi-level: high access delay sensitivity, medium access delay sensitivity and low access delay sensitivity;

it also can be a combination of multiple Qos requirements, such as:

high access delay sensitivity+low Guaranteed BitRate+low bit error rate requirement; or medium access delay sensitivity+high Guaranteed BitRate+low bit error rate requirement.

The above Qos requirements also can be divided into more detailed levels.

The description "Settings of the RRC establishment cause list can be one or multiple combinations of the following information" means that the RRC establishment cause list can be one or more, or one combination or multiple combinations of the above all characteristic information.

For example, Table 1 is one example of the RRC establishment cause list (a combination of priority information and user equipment type information):

TABLE 1

| Serial number | RRC establishment cause |
| --- | --- |
| 0 | Emergency |
| 1 | highPriorityAccess |
| 2 | mt-Access |
| 3 | mo-Signalling |
| 4 | mo-Data |
| 5 | low Priority level 1 MTC equipment |
| 6 | low Priority level 2 MTC equipment |
| 7 | low Priority level 3 MTC equipment |

Table 2 is another example of the RRC establishment cause list (a combination of service model information and Qos requirement information):

TABLE 2

| Serial number | RRC establishment cause |
| --- | --- |
| 0 | Emergency |
| 1 | highPriorityAccess |
| 2 | mt-Access |

TABLE 2-continued

| Serial number | RRC establishment cause |
| --- | --- |
| 3 | mo-Signalling |
| 4 | mo-Data |
| 5 | high frequency small data volume model, and high access delay sensitivity |
| 6 | low frequency big data volume model, and low access delay sensitivity |
| 7 | extra-low frequency small data volume model, and low access delay sensitivity |

It can still have other combination modes to constitute a newly added RRC establishment cause.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The invention is not limited to any combination of hardware and software in a specific form.

The above description is only the preferred examples of the invention, which is not used to limit the protection scope of the invention. According to the invention contents of the invention, there are other various examples. The person skilled in the art can make various corresponding changes and transformations according to the invention without departing from the spirit and essence of the invention. All the modifications, equivalent substitutions, and improvements and so on made within the spirit and principle of the invention shall fall into the protection scope of the invention.

INDUSTRIAL APPLICABILITY

Compared with the related art, with the method and system for admission control in the present document, it enables the user equipment to report more accurate information related to call establishment types, so as to assist the network side to perform more flexible and precise admission control.

What is claimed is:

1. A method for radio resource control, comprising:
in a process of establishing a Radio Resource Control (RRC) connection, a user equipment sending a RRC connection request message to a base station, and carrying information used for indicating a current access property in the RRC connection request message, enabling the base station to judge whether to permit the user equipment to establish the RRC connection according to the information used for indicating the current access property, wherein the user equipment selects the information used for indicating the current access property from a RRC establishment cause list predetermined by the user equipment and a network side;
wherein each RRC establishment cause in the RRC establishment cause list comprises Quality of Service (QoS) requirement type information of service, the QoS requirement type information of service comprises insensitive to access delay.

2. The method according to claim 1, further comprising:
the user equipment selecting the information used for indicating the current access property from the RRC establishment cause list predetermined by the user equipment and the network side in a following way:

the user equipment selecting a RRC establishment cause in accordance with the current access property from the RRC establishment cause list, and using an index corresponding to the selected RRC establishment cause as the information used for indicating the current access property to be added in the RRC connection request message.

3. A user equipment used in a system for radio resource control, configured to:

in a process of establishing a Radio Resource Control (RRC) connection, send a RRC connection request message to a base station, and carry information used for indicating a current access property in the RRC connection request message so as to enable the base station to judge whether to permit the user equipment to establish the RRC connection according to the information used for indicating the current access property, and before sending the RRC connection request message to the base station, select the information used for indicating the current access property from a RRC establishment cause list predetermined by the user equipment and a network side;

wherein each RRC establishment cause in the RRC establishment cause list comprises Quality of Service (QoS) requirement type information of service, the QoS requirement type information of service comprises insensitive to access delay.

4. The user equipment according to claim 3, wherein, the user equipment is configured to select the information used for indicating the current access property in a following way: selecting a RRC establishment cause in accordance with the current access property from the RRC establishment cause list, and using the selected RRC establishment cause as the information used for indicating the current access property to be added in the RRC connection request message.

5. The user equipment according to claim 3, wherein, the system is a long term evolution system or a universal mobile telecommunications system.

\* \* \* \* \*